US007822963B2

(12) United States Patent
Willems

(10) Patent No.: US 7,822,963 B2
(45) Date of Patent: Oct. 26, 2010

(54) REMOTE COMPUTER OPERATING SYSTEM UPGRADE

(75) Inventor: Richard A. Willems, Colorado Springs, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 812 days.

(21) Appl. No.: 11/758,618

(22) Filed: Jun. 5, 2007

(65) Prior Publication Data

US 2008/0307215 A1  Dec. 11, 2008

(51) Int. Cl.
*G06F 9/445* (2006.01)

(52) U.S. Cl. .............................. 713/2; 713/1; 717/168; 717/172

(58) Field of Classification Search .................. 713/1, 713/2; 717/168, 172; 714/15
See application file for complete search history.

(56) References Cited

U.S. PATENT DOCUMENTS

| 5,450,589 | A | 9/1995 | Maebayashi et al. |
| 5,452,339 | A | 9/1995 | Siu et al. |
| 6,128,734 | A * | 10/2000 | Gross et al. ................. 713/100 |
| 6,275,931 | B1 | 8/2001 | Narayanaswamy et al. |
| 6,308,265 | B1 * | 10/2001 | Miller ............................ 713/2 |
| 6,378,086 | B1 | 4/2002 | Crowley et al. |
| 6,490,722 | B1 | 12/2002 | Barton et al. |
| 6,557,169 | B1 * | 4/2003 | Erpeldinger ................. 717/173 |
| 6,591,376 | B1 | 7/2003 | VanRooven et al. |
| 6,615,404 | B1 | 9/2003 | Garfunkel et al. |
| 6,892,297 | B1 * | 5/2005 | Aguilar et al. .................. 713/2 |
| 7,085,957 | B2 | 8/2006 | Sundareson et al. |
| 7,233,985 | B2 * | 6/2007 | Hahn et al. ..................... 713/2 |
| 2004/0187104 | A1 * | 9/2004 | Sardesai et al. ............. 717/174 |

* cited by examiner

*Primary Examiner*—Thuan N Du

(57) ABSTRACT

Methods of upgrading a kernel image of a remote computer are described. The method comprises, during a first connection between an update computer and a remote computer, storing a kernel version identifier of the active kernel image of the remote computer; storing active boot partition information comprising the active kernel boot partition of the remote computer; setting the active boot partition of the remote computer as a safe boot partition; storing a second kernel image at the remote computer, wherein the second kernel image comprises a second kernel version identifier; setting the remote computer to boot from the second kernel image; rebooting the remote computer; and, during a second connection between the update computer and the remote computer, marking the second kernel image as a safe kernel image if the active kernel version is the same as the second kernel version identifier.

20 Claims, 4 Drawing Sheets

REMOTE COMPUTER OPERATING SYSTEM UPGRADE

BACKGROUND

Many information technology service providers locate a remote computer system at a customer site in order to support customer service offerings. Frequently, the remote computer system is operated in a lights-out environment and communication with the device is performed using a network connection from the service provider to the customer site. The service provider manages the remote computer system in order to update the operating system kernel image of the remote computer system, e.g., for security patches or new functionality. If the remote computer operating system fails to boot after a new kernel image is installed, the remote system is rendered unusable and network connectivity is lost requiring manual intervention, and attendant travel, by the service provider to the remote computer system.

DESCRIPTION OF THE DRAWINGS

One or more embodiments are illustrated by way of example, and not by limitation, in the figures of the accompanying drawings, wherein elements having the same reference numeral designations represent like elements throughout and wherein.

DETAILED DESCRIPTION

Figure 1:
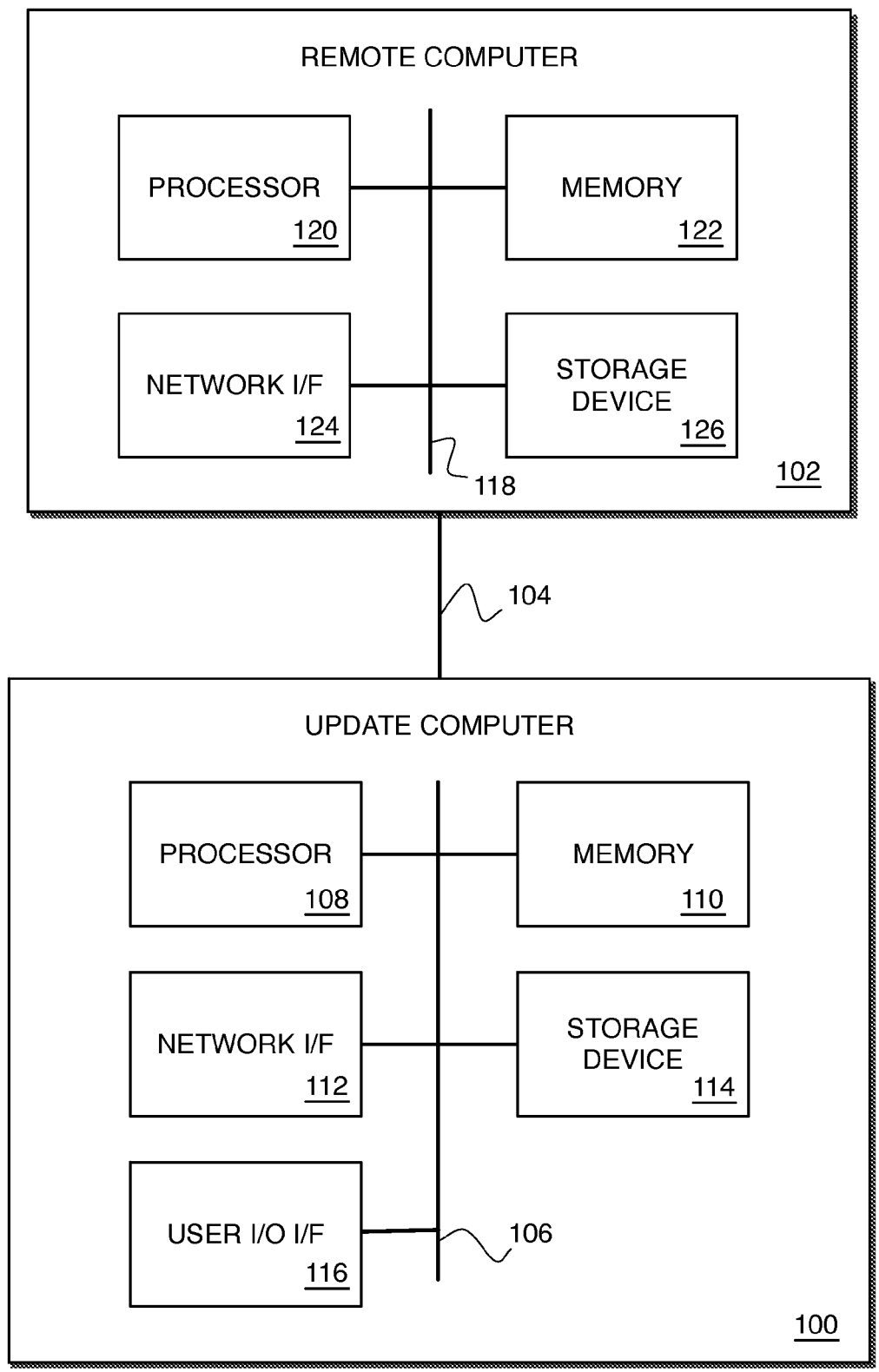
FIG. 1 is a high-level functional block diagram of two computer systems usable in conjunction with an embodiment.

FIG. 1 depicts a high-level functional block diagram of a first computer (an "update computer") 100 connected to a second computer (a "remote computer") 102 via a network connection 104. In at least some embodiments, network connection 104 may be a wired and/or wireless connection. In at least some embodiments, remote computer 102 is physically inaccessible or accessible to a minimal degree from update computer 100. In at least some embodiments, remote computer 102 is geographically distant from update computer 100.

In operation, update computer 100 transmits, using network connection 104, a new kernel image to remote computer 102 and causes the remote computer to attempt to reboot using the newly-supplied kernel image in place of a previous kernel image. If remote computer 102 fails to boot using the newly supplied kernel image, the remote computer reboots using the previous kernel image.

After remote computer 102 reboots, update computer 100 connects to remote computer 102 via network connection 104 and determines whether the remote computer booted from the newly-supplied kernel image or the previous kernel image. If remote computer 102 booted from the previous kernel image, update computer 100 again transmits the new kernel image to the remote computer and causes the remote computer to attempt to reboot using the newly-supplied kernel image. If remote computer 102 booted from the newly-supplied kernel image, update computer 100 causes the remote computer to mark the newly-supplied kernel image as a safe kernel image from which to boot.

As depicted in FIG. 1, update computer 100 comprises a bus 106 or other communication mechanism for communicating information, and a processor 108 communicatively coupled with the bus. Update computer 100 also comprises a memory 110, such as a static or non-volatile memory, e.g., a read only memory (ROM), or a dynamic or volatile memory, e.g., a random access memory (RAM), a flash memory, etc., communicatively coupled to bus 106 for storing instructions to be executed by processor 108. Memory 110 also may be used for storing temporary variables or other intermediate information during execution of instructions by processor 108.

Update computer 100 also comprises a network interface (I/F) 112 communicatively coupled to bus 106 and network connection 104. Network I/F 112 provides unidirectional and/or bidirectional data communication between update computer 100 and other devices, e.g., remote computer 102, connected with the update computer. In at least some embodiments, network I/F 112 may be a wired and/or wireless communication interface. In at least one embodiment, network I/F 112 transmits and receives electrical, electromagnetic, and/or optical signals which carry digital data streams representing various types of information.

Update computer 100 also comprises a storage device 114 for storing information. In at least some embodiments, storage device 114 may comprise one or more of flash memory, a hard drive, a compact disc, a digital versatile disc, or another storage medium. Storage device 114 is communicatively coupled with bus 106. In at least some embodiments, update computer 100 may omit storage device 114 and solely use memory 110 for storage of information.

Update computer 100 also comprises a user input/output (I/O) I/F 116 communicatively coupled with bus 106 for transmitting information to a user and/or receiving user input, e.g., commands and/or information. In at least some embodiments, user I/O I/F 116 comprises a display for displaying information from update computer 100 and/or remote computer 102 via network connection 104 and one or more user input devices for receiving user commands for transmission to the update computer and/or the remote computer. In at least some embodiments, user I/O I/F 116 may comprise a cathode-ray tube, liquid crystal display, organic light emitting diode, or other type display device. In at least some embodiments, user I/O I/F 116 may comprise a keyboard, mouse, trackball, pen, or other user input device.

According to at least one embodiment, update computer 100 operates in response to processor 108 executing sequences of instructions contained in memory 110. Such instructions may be read into memory 110 from a computer-readable medium, network I/F 112, and/or storage device 114. Execution of the sequences of instructions contained in memory 110 causes the processor 108 to perform the process steps described below. In one or more alternative embodiments, hard-wired circuitry may be used in place of or in combination with a set of instructions to implement the embodiments. Thus, embodiments are not limited to any specific combination of hardware circuitry and software.

Network connection 104, in at least some embodiments, provides data communication through one or more networks to other devices, i.e., remote computer 102. Update computer 100 may transmit and/or receive messages and/or data, through network connection 104. In at least some embodiments, update computer 100 may transmit and/or receive a set of executable instructions for execution by a processor, e.g., processor 108. The set of executable instructions may be executed by processor 108 as the instructions are received, and/or stored in memory 110 for later execution.

Remote computer 102 comprises a bus 118, a processor 120, a memory 122, a network I/F 124, and a storage device 126 which are similar to bus 106, processor 108, memory 110, network I/F 112, and storage device 114, respectively. In at least some embodiments, remote computer 102 may comprise a user I/O I/F similar to user I/O I/F 116 of update computer 100. In at least some embodiments, remote computer 102 may omit storage device 126 and solely use memory 122 for storage of information.

Figure 2:
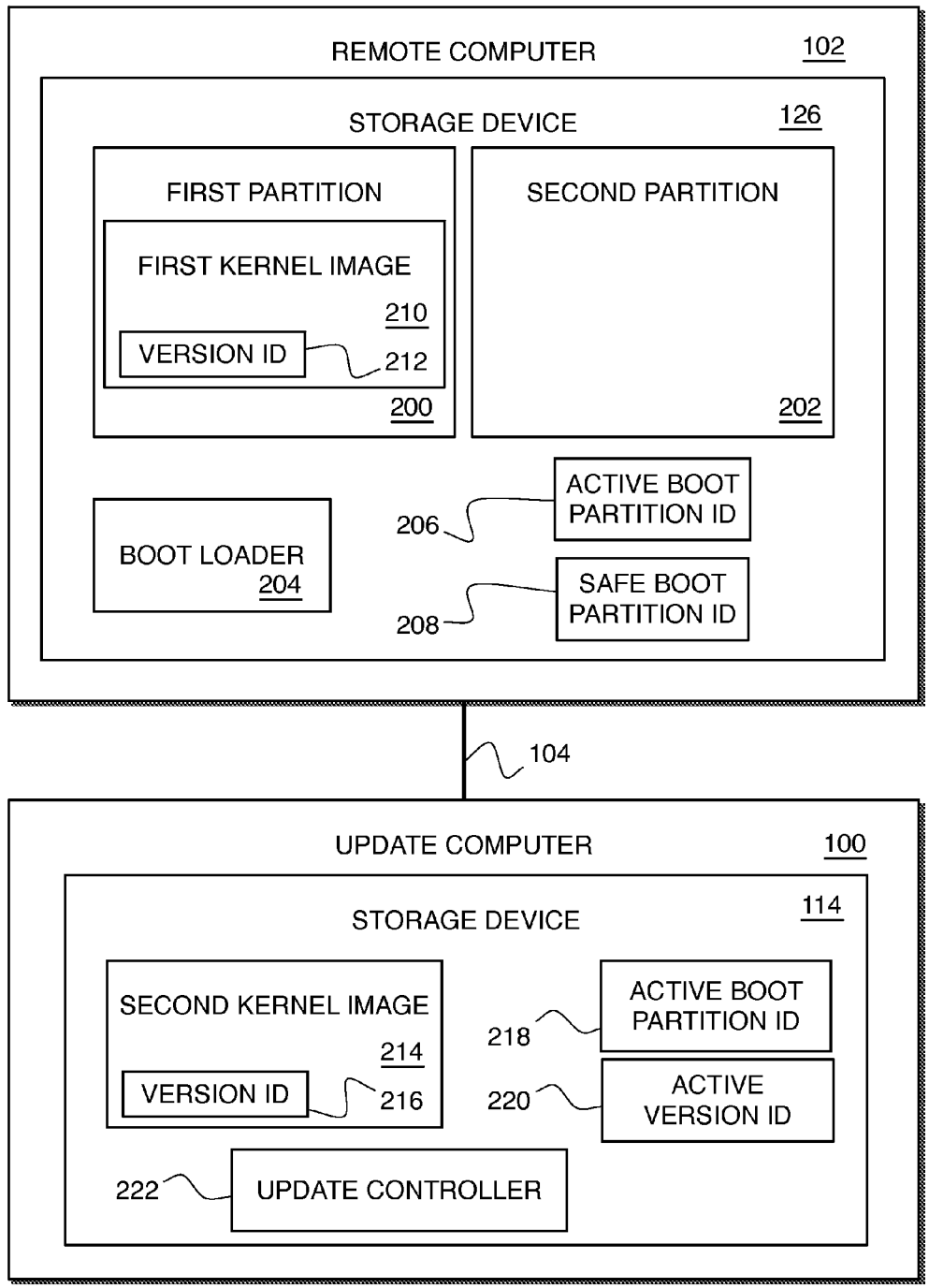
FIG. 2 is a high-level block diagram of a portion of two memories usable in conjunction with an embodiment.

FIG. 2 depicts a high-level block diagram of a portion of update computer 100 and remote computer 102. Specifically, FIG. 2 depicts at least a portion of the contents of storage device 114 of update computer 100 and storage device 126 of remote computer 102.

Storage device 126 comprises a first partition 200, a second partition 202, and a bootloader 204, i.e., a set of executable instructions which, when executed by processor 120, cause the processor to boot the remote computer using a kernel image stored in one of the first or second partitions. First partition 200 and second partition 202 are logical divisions of storage device 126.

Storage device 126 also comprises an active boot partition identifier (ID) 206 which stores a value indicating which partition, e.g., of first and second partitions 200, 202, stores the currently executing kernel image of remote computer 102. Storage device 126 also comprises a safe boot partition ID 208 which stores a value indicating which partition, e.g., of first and second partitions 200, 202, stores a kernel image which is able to successfully boot remote computer 102 such as a last known good/most recently used bootable kernel image.

First partition 200 further comprises a first kernel image 210 comprising a set of instructions which, when executed by processor 120, causes the processor to control operation of remote computer 102. First kernel image 210, in turn, comprises a version ID 212 indicating the version of the first kernel image.

In at least some embodiments, second partition 202 is empty in an initial state. In at least some embodiments, second partition 202 comprises a duplicate image of first kernel image 210 in an initial state. In at least some embodiments, second partition 202 comprises another kernel image which differs from first kernel image 210 in an initial state.

Storage device 114 comprises a second kernel image 214 for installation on remote computer 102. Second kernel image 214 comprises a set of instructions which, when executed by processor 120, causes the processor to control operation of remote computer 102. Second kernel image 214, in turn, comprises a version ID 216 indicating the version of the second kernel image. In at least some embodiments, second kernel image 214 comprises a modified, e.g., updated, patched, etc., version of first kernel image 210.

Storage device 114 also comprises an active boot partition ID 218 which stores a value indicating which partition of remote computer 102 is the partition from which the remote computer has booted a particular kernel image.

Storage device 114 also comprises an active kernel version ID 220 which stores a value indicating the version ID of the kernel image which was being executed by processor 120 during a prior connection between update computer 100 and remote computer 102.

Storage device 114 also comprises an update controller 222 comprising a set of instructions which, when executed by processor 108, causes the processor to update the kernel image on remote computer 102 with second kernel image 214 according to an embodiment.

Figure 3:
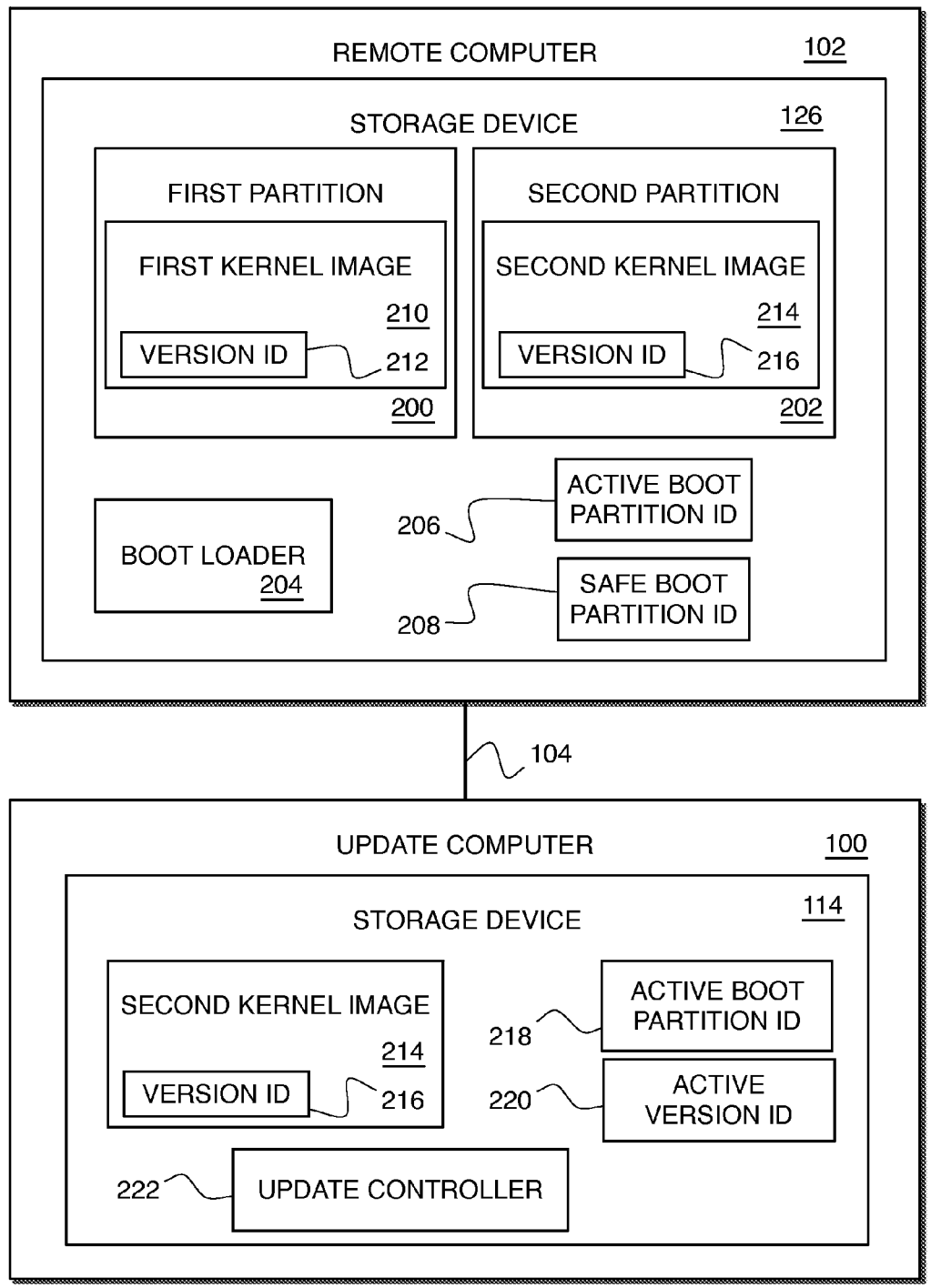
FIG. 3 is a high-level block diagram of the FIG. 2 embodiment after transfer of a kernel image to a remote computer.

FIG. 3 depicts a version of the FIG. 2 embodiment after update computer 100 transmits a copy of second kernel image 214 to remote computer 102 via network connection 104.

Figure 4:
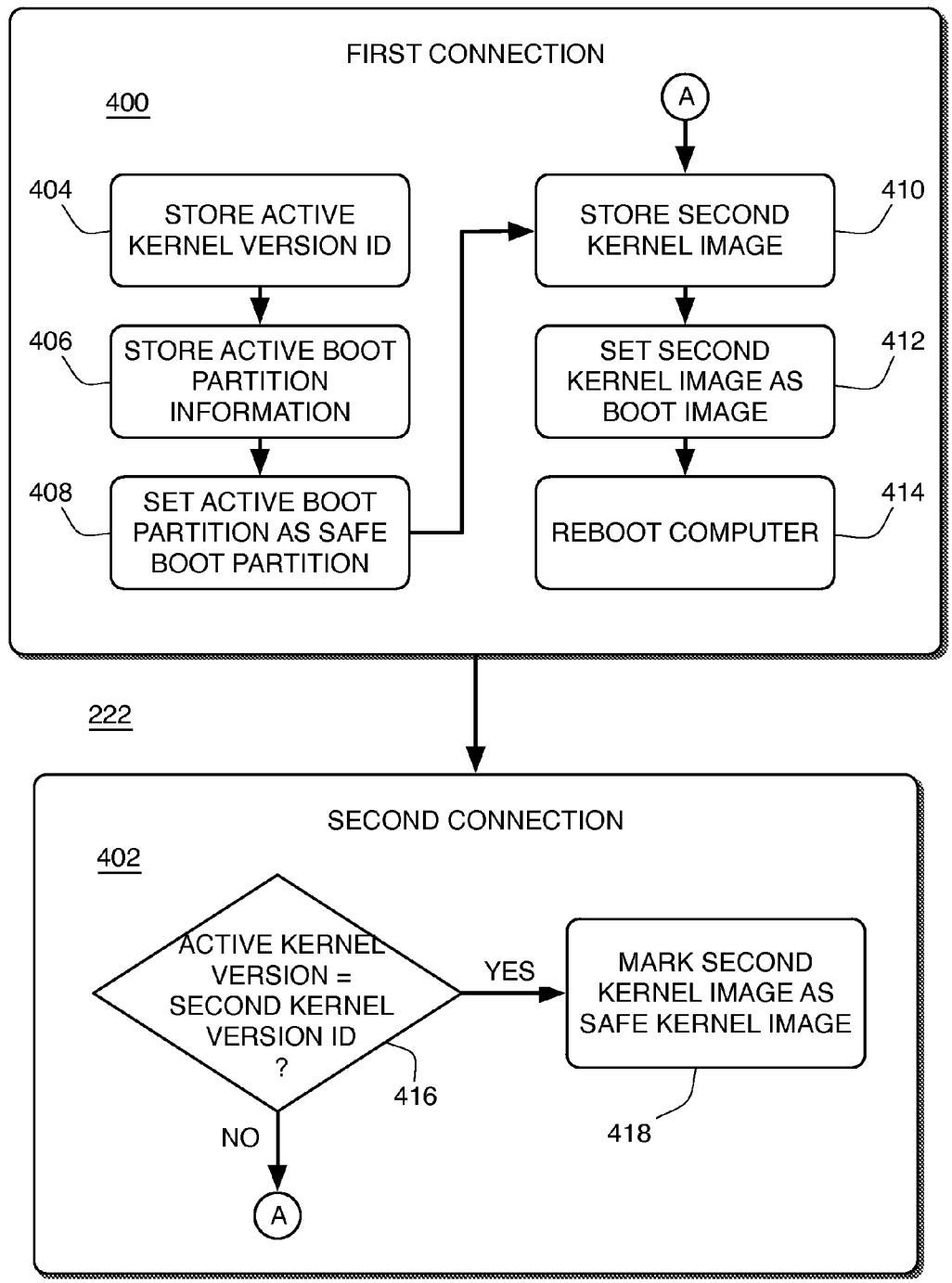
FIG. 4 is a high-level process flow diagram of a method according to an embodiment.

FIG. 4 depicts a high-level process flow diagram of at least a portion of update controller 222 of update computer 100 according to an embodiment. The process flow of update controller 222 comprises a first connection period 400 and a second connection period 402 during which update computer 100 communicatively connects with remote computer 102 via network connection 104.

During first connection period 400, the flow begins at functionality 404 wherein update controller 222 communicates, e.g., via network I/F 112, with remote computer 102 to determine the active kernel version ID 212. Execution of update controller 222 causes processor 108 to store the active kernel version ID in active version ID 220 of storage device 114.

The flow then proceeds to functionality 406 wherein update controller 222 causes processor 108 to communicate with remote computer 102 to determine the active boot partition ID 206. Execution of update controller 222 causes processor 108 to store the active boot partition ID in active boot partition ID 218 of storage device 114.

The flow then proceeds to functionality 408 wherein update controller 222 causes processor 108 to communicate with remote computer 102 to cause the remote computer to set the safe boot partition ID 208 to be the active boot partition ID 206, i.e., an indicator of first partition 200.

The flow then proceeds to functionality 410 wherein update controller 222 causes processor 108 to transmit second kernel image 214 to remote computer 102, specifically, to second partition 202.

The flow then proceeds to functionality 412 wherein update controller 222 causes processor 108 to communicate with remote computer 102 to cause the remote computer to set second kernel image 214 as the active boot image, i.e., store an identifier of second partition 202 as active boot partition ID 206.

The flow then proceeds to functionality 414 wherein update controller 222 causes processor 108 to transmit a command to remote computer 102 to cause the remote computer to reboot.

After transmission of the reboot command to remote computer 102, communication between update computer 100 and the remote computer is terminated. Reboot of remote computer 102 causes bootloader 204 to be executed by processor 120 wherein the bootloader reads the active boot partition ID 206, which was set to an identifier of second partition 202 (functionality 412), and boots the remote computer using the identified kernel image, i.e., second kernel image 214 in the second partition.

Bootloader 204 is responsible for transferring control from the bootloader to the kernel image of the remote computer 102. Bootloader 204 performs one or more checks on the kernel image to be executed in order to verify the correctness of the kernel image prior to relinquishing control. The checks performed by bootloader 204 comprise one or more sanity checks such as verifying that a kernel image exists on the media pointed to by the boot instructions issued by update computer 100, verifying that the kernel image has a valid kernel signature, and verifying that the transfer of the kernel image from storage device 126 to memory 122 was successful. If bootloader 204 determines that the remote computer 102 cannot be successfully booted using the new kernel image, e.g., second kernel image 214, based on the performed checks, the bootloader boots remote computer 102 using the kernel image from the partition specified by safe boot partition ID 208, i.e., first kernel image 210.

In at least some embodiments, bootloader 204 initializes a timer, e.g., a watchdog timer, to begin operation prior to relinquishing control to the kernel image to be executed on remote computer 102. The timer may comprise a hardware-based timer which requires receipt of a reset signal in order to prevent the timer from causing a reboot of remote computer 102. In at least some embodiments, the timer requires periodic receipt of the reset signal from the executing kernel image in order to avoid a reboot caused by the timer. In this manner, if second kernel image 214 passes the bootloader 204 checks and later fails and/or encounters an error condition preventing execution, the timer upon reaching a predetermined value will cause remote computer 102 to reboot. Upon reboot, bootloader 204 reads the safe boot partition ID 208 and transfers control to first kernel image 210 to boot remote computer 102.

After remote computer 102 reboots, update computer 100 establishes a communication connection with the remote computer via network connection 104. In at least some embodiments, update computer 100 periodically attempts to establish a communication connection with remote computer 102 after losing the connection with the remote computer. In at least some embodiments, update computer 100 waits a predetermined amount of time before attempting to establish a communication connection with remote computer 102.

After re-establishing a communication connection with remote computer 102 (beginning of second connection period 402), update controller 222 executed by processor 108 causes the processor to perform functionality 416. During functionality 416, update controller 222 causes processor 108 to communicate with remote computer 102 to determine the active kernel version ID, i.e., the version ID of the currently executing kernel image of the remote computer. Update controller 222 then compares the determined active kernel version ID with the kernel version ID of the second kernel image stored in storage device 114.

If the result of comparison functionality 416 is negative ("NO") (the active kernel version ID of remote computer 102 is not the kernel version ID of the second kernel image), the flow returns to functionality 410 to attempt to install second kernel image 214 on remote computer 102 another time.

If the result of comparison functionality 416 is positive ("YES") (the active kernel version ID of remote computer 102 is the same as the kernel version ID of the second kernel image), the flow proceeds to functionality 418 wherein update controller 222 causes processor 108 to communicate with remote computer 102 and cause the remote computer to set the safe boot partition ID 208 to be the active boot partition ID 206, i.e., an indicator of second partition 202. After execution of functionality 418, remote computer 102 has been successfully update by update controller 222 and the process flow terminates.

What is claimed is:

1. A method of upgrading a kernel of a remote computer, the method comprising:
   during a first connection between an update computer and a remote computer:
      storing a kernel version identifier of a first kernel of the remote computer, wherein the first kernel is the active kernel of the remote computer;
      storing active boot partition information of the remote computer, wherein the active boot partition information comprises the boot partition storing the active kernel;
      setting the active boot partition of the remote computer as a safe boot partition;
      storing a second kernel image at the remote computer, wherein the second kernel image comprises a second kernel version identifier;
      setting the remote computer to boot from the second kernel image;
      rebooting the remote computer; and
   during a second connection between the update computer and the remote computer:
      marking the second kernel image as a safe kernel image if the active kernel version is the same as the second kernel version identifier.

2. The method of claim 1, wherein during the second connection between the update computer and the remote computer further comprises:
   repeating the storing the second kernel image at the remote computer and rebooting the remote computer if the active kernel version differs from the second kernel version identifier.

3. The method of claim 1, wherein storing a second kernel image comprises storing the second kernel image in a boot partition other than the active boot partition.

4. The method of claim 1, further comprising:
   prior to the second connection between the update computer and the remote computer:
      rebooting the remote computer from the first kernel image.

5. The method of claim 4, wherein during the second connection between the update computer and the remote computer further comprises:
   repeating the storing the second kernel image at the remote computer and rebooting the remote computer if the active kernel version is the first kernel version identifier.

6. The method of claim 1, wherein setting the remote computer to boot from the second kernel image comprises:
   setting the partition in which the second kernel image is stored at the remote computer as the active boot partition.

7. The method of claim 1, further comprising:
   waiting a predetermined amount of time prior to establishing the second connection between the update computer and the remote computer.

8. The method of claim 1, further comprising:
   repeatedly attempting to establish the second connection between the first computer and the remote computer.

9. A method of upgrading a remote computer kernel, the method comprising:
   establishing a first communication connection with the remote computer, wherein the remote computer comprises an active boot partition and an active kernel;
   determining the version of the active kernel of the remote computer during the first communication connection;
   setting the active boot partition as a safe boot partition during the first communication connection;
   transmitting a first kernel to a first boot partition of the remote computer during the first communication connection;
   establishing a second communication connection with the remote computer after a reboot of the remote computer performed subsequent to transmission of the first kernel;
   setting the first boot partition as the safe boot partition during the second communication connection if the version of the active kernel of the remote computer after reboot corresponds to the version of the transmitted first kernel.

10. The method of claim 9, further comprising:

transmitting the first kernel to the first boot partition of the remote computer during the second communication connection if the version of the active kernel of the remote computer after reboot corresponds to the result of determining the version of the active kernel of the remote computer during the first communication connection.

11. The method of claim 9, further comprising:

transmitting the first kernel to the first boot partition of the remote computer during the second communication connection if the version of the active kernel of the remote computer after reboot differs from the version of the transmitted first kernel.

12. The method of claim 9, further comprising:

determining the active boot partition of the remote computer during the first communication connection; and wherein the setting the active boot partition as a safe boot partition comprises:

causing the remote computer to identify the active boot partition as a safe boot partition.

13. The method of claim 9, further comprising:

rebooting the remote computer after transmission of the first kernel to the remote computer.

14. The method of claim 9, further comprising:

determining the active boot partition of the remote computer during the first communication connection.

15. A memory storing instructions which, when executed by a processor, cause the processor to:

establish a first connection to a remote computer;

store a kernel version identifier of a first kernel of the remote computer, wherein the first kernel is the active kernel of the remote computer;

store active boot partition information of the remote computer, wherein the active boot partition information comprises the boot partition storing the active kernel;

set the active boot partition of the remote computer as a safe boot partition;

store a second kernel image at the remote computer, wherein the second kernel image comprises a second kernel version identifier;

set the remote computer to boot from the second kernel image;

reboot the remote computer;

establish a second connection to the remote computer; and mark the second kernel image as a safe kernel image if the active kernel version is the same as the second kernel version identifier.

16. The memory of claim 15, further comprising instructions which, when executed by the processor, cause the processor to:

store the second kernel image at the remote computer and reboot the remote computer if the active kernel version differs from the second kernel version identifier.

17. The memory of claim 15, wherein the instructions to cause the processor to store the second kernel image comprise instructions which, when executed by the processor, cause the processor to:

store the second kernel image in a non-active boot partition.

18. The memory of claim 15, further comprising instructions which, when executed by the processor, cause the processor to:

store the second kernel image at the remote computer and reboot the remote computer if the active kernel version is the same as the kernel version identifier of the first kernel.

19. The memory of claim 15, wherein the instructions to cause the processor to set the remote computer to boot from the second kernel image comprise:

setting the partition in which the second kernel image is stored as the active boot partition.

20. The memory of claim 15, further comprising instructions which, when executed by the processor, cause the processor to:

wait a predetermined amount of time prior to establishing the second connection to the remote computer.

* * * * *